(12) United States Patent  
Bader (10) Patent No.: US 11,079,247 B2  
(45) Date of Patent: Aug. 3, 2021

(54) METHOD FOR ASSISTING A USER OF A MOTOR VEHICLE WHEN DRIVING THE MOTOR VEHICLE, NAVIGATION APPARATUS AND MOTOR VEHICLE

(71) Applicant: Volkswagen Aktiengesellschaft, Wolfsburg (DE)

(72) Inventor: Viktor Bader, Wolfsburg (DE)

(73) Assignee: VOLKSWAGEN AKTIENGESELLSCHAFT, Wolfsburg (DE)

(*) Notice: Subject to any disclaimer, the term of this patent is extended or adjusted under 35 U.S.C. 154(b) by 574 days.

(21) Appl. No.: 15/991,352

(22) Filed: May 29, 2018

(65) Prior Publication Data

US 2018/0340789 A1    Nov. 29, 2018

(30) Foreign Application Priority Data

May 29, 2017   (DE) ...................... 10 2017 208 931.8

(51) Int. Cl.
  *G01C 21/34*    (2006.01)
  *G06K 9/00*    (2006.01)
  *G01C 21/36*    (2006.01)

(52) U.S. Cl.
  CPC ..... *G01C 21/3476* (2013.01); *G01C 21/3415* (2013.01); *G01C 21/3484* (2013.01);
  (Continued)

(58) Field of Classification Search
  None
  See application file for complete search history.

(56) References Cited

U.S. PATENT DOCUMENTS 9,008,888 B1 * 4/2015 Gravino ............. G01C 21/3682  
  701/26  
10,197,408 B1 * 2/2019 Ledet ................. G02B 27/0103  
(Continued)

FOREIGN PATENT DOCUMENTS

DE    102014016837 A1    5/1916    ............. B60R 16/02  
DE        10059746 A1   10/2001    ............. G01C 21/36  
(Continued)

OTHER PUBLICATIONS

Odagawa; Machine translation of WO 2014162572; Oct. 2014, espacenet.com (Year: 2014).*

*Primary Examiner* — David P. Merlino  
(74) *Attorney, Agent, or Firm* — Slayden Grubert Beard PLLC (57) ABSTRACT

The invention relates to a method for assisting a user of a motor vehicle when driving the motor vehicle. A travel route is provided by a navigation apparatus, and a route actually being driven by the motor vehicle is ascertained. A comparison is made between the actual driving route ascertained and the travel route provided, and if a deviation criterion is met, it is ascertained that the motor vehicle has left the travel route provided. As a function of the ascertained departure from the travel route provided, at least one geo-object from a predefined category of geo-objects is established, the established geo-object is predefined as a geo-object having a user-specific interest and, as a function of the predefined geo-object, the established travel route is changed to an alternative route to the destination with the predefined geo-object as an intermediate destination.

11 Claims, 3 Drawing Sheets

(52) U.S. Cl.
CPC ..... *G01C 21/3492* (2013.01); *G01C 21/3617* (2013.01); *G06K 9/00818* (2013.01)

(56) References Cited

U.S. PATENT DOCUMENTS

| | | | | |
|---|---|---|---|---|
| 2009/0177378 A1* | 7/2009 | Kamalski | ............... | G01C 21/26 |
| | | | | 701/408 |
| 2011/0082640 A1* | 4/2011 | Bohme | .............. | G06K 9/00818 |
| | | | | 701/533 |
| 2011/0166775 A1* | 7/2011 | Takeuchi | ............. | G01C 21/343 |
| | | | | 701/533 |
| 2014/0278091 A1* | 9/2014 | Horvitz | ................ | G06Q 10/047 |
| | | | | 701/533 |
| 2015/0106011 A1* | 4/2015 | Nesbitt | .............. | G01C 21/3679 |
| | | | | 701/412 |
| 2015/0191084 A1 | 7/2015 | Fuehrer | ........................... | 701/96 |
| 2016/0076906 A1* | 3/2016 | Hinnegan | ............ | G01C 21/36 |
| | | | | 701/408 |
| 2016/0349068 A1 | 12/2016 | Nesbitt | ........................ | 701/414 |
| 2017/0364066 A1* | 12/2017 | Yamada | .......... | B60W 30/18163 |
| 2018/0299897 A1* | 10/2018 | Cashier | ................ | G05D 1/0088 |

FOREIGN PATENT DOCUMENTS

| | | | | |
|---|---|---|---|---|
| DE | 102006050096 A1 | 11/2007 | ............. | G01C 21/34 |
| DE | 102007059761 A1 | 6/2009 | ............. | G01C 21/34 |
| DE | 102008043167 A1 | 4/2010 | ............. | G01C 21/34 |
| DE | 102012212065 A1 | 1/2014 | ............. | B60W 40/04 |
| EP | 3396321 A2 | 10/1918 | ............. | G01C 21/34 |
| JP | 2012233725 A | 11/2012 | ............. | G01C 21/26 |
| KR | 20170040969 A * | 4/2017 | | |
| WO | 2014/162572 A1 | 10/2014 | ............. | G01C 21/34 |
| WO | WO-2014162572 A1 * | 10/2014 | ......... | G01C 21/3484 |

\* cited by examiner

METHOD FOR ASSISTING A USER OF A MOTOR VEHICLE WHEN DRIVING THE MOTOR VEHICLE, NAVIGATION APPARATUS AND MOTOR VEHICLE

CROSS-REFERENCE TO RELATED APPLICATIONS

This application claims priority to DE Application No. 10 2017 208 931.8 filed May 29, 2017, the contents of which are hereby incorporated by reference in their entirety.

TECHNICAL FIELD

The invention relates to a method for assisting a user of a motor vehicle when driving the motor vehicle. The method according to the invention is performed by means of a navigation apparatus, i.e., with a device or a device component, which is set up to evaluate position and navigation signals, to establish travel routes and to produce signals. The navigation apparatus can be configured, by way of example, as a navigation device.

BACKGROUND

Navigation devices and navigation systems in motor vehicles make it possible to be guided in a convenient manner by map material to a particular destination, if necessary via predefined intermediate destinations. However, the scenario frequently occurs where the driver deliberately leaves a predefined driving route, for example at an off-ramp of a freeway, in order, for example, to drive to a truck stop (in contrast to exiting the freeway for services or a rest area).

If the driving route predefined by the navigation system is left, the navigation device will attempt to guide the driver back to said route again, i.e., back to the exemplary freeway. The driver should not manually update the new intermediate destination with the truck stop while driving before or after the off-ramp and should leave his hands on the steering wheel.

DE 100 59 746 A1 describes a method for computer-assisted travel route planning and travel route guidance, which considers dynamic alterations in both the traffic situation as well as a change in appointments. The problem described above of the driver being confronted with a situation of having to readjust the navigation system during driving is, however, not broached or discussed in this printed publication.

A system for proposing a route for a motor vehicle is known from DE 10 2014 016 837 A1, wherein a destination is predefined as a function of a conduct of an occupant. In the exemplary situation where the driver would not like to drive to a more expensive filling station at the service area, but instead to a less expensive truck stop located off the freeway, the driver would, however, have to demonstrate by his conduct that he prefers the truck stop. It therefore appears that such a driver wish can be realized less expediently with the method of DE 10 2014 016 837 A1.

Finally, DE 10 2012 212 065 A1 describes a driver assistance system having a congestion assistant, wherein a destination is considered as a function of a duration in time of a traffic jam, and possible exits and/or parking places are considered. This printed publication does not address the problem described above.

DE 10 2007 059 761 A1 relates to a method for route planning and destination guidance for truck drivers, in which a driving route from a starting location to a destination location is calculated and output such that, after a predefined driving time, an interruption in a journey is planned, wherein parking places located on the driving route at a point in time and/or a period of time of the interruption are included as an intermediate destination and/or destination location in the establishment of the driving route. A capacity utilization of the parking places is considered during the establishment of the driving route as input information. DE 10 2007 059 761 A does not, however, provide any flexibility with respect to intermediate destinations which can be freely determined, by way of example the truck stop indicated above.

SUMMARY

One of the objects, which form the basis of the invention is to provide route planning with improved flexibility with regard to intermediate destinations which can be freely determined when driving.

The object is solved by the method according to the invention and the devices according to the invention in accordance with the associated claims. Embodiments of the invention are described in the dependent claims and the following description.

The invention is based on the idea that, in the event of a change in the route actually being driven with respect to the driving route proposed by the navigation system, a new intermediate destination in the vicinity of the present vehicle position is determined and an alternative travel route which considers the intermediate destination is provided, wherein the alternative travel route has the original destination, however, as the destination.

BRIEF DESCRIPTION OF THE DRAWINGS

In the following, the present invention will be explained in greater detail on the basis of various embodiments. In the FIGS., the same reference signs designate the same or similar elements.

DETAILED DESCRIPTION OF EMBODIMENTS

In one exemplary aspect, the method for assisting a user of a motor vehicle when driving the motor vehicle has the following steps performed by a navigation apparatus, wherein the navigation apparatus can be configured, by way of example, as a navigation device or navigation system.

A travel route, which describes a journey from a starting point to a destination is provided, an actual route driven by the motor vehicle is ascertained, by way of example, by detecting a traveling motion of the motor vehicle, and, on the basis of the detected traveling motion, the actual route driven by the motor vehicle is established.

The method according to the present aspect is characterized by the following steps performed by the navigation apparatus. The actual driving route ascertained is compared with the travel route provided and if the result of the comparison is that the actual route driven by the motor vehicle meets a deviation criterion, it is ascertained that the motor vehicle has left the route provided. In other words, it is checked on the basis of the established, actual driving route whether the motor vehicle has left the travel route provided and if the result of this checking process is that the route actually being driven meets a deviation criterion, it is ascertained that the motor vehicle has left the travel route provided. The advantage of this is that certain tolerances can also be included by the deviation criterion. If, by way of example, no current map material is saved on the navigation apparatus and if the motor vehicle is located at that moment in an area of roadworks where a street alignment of the formerly straight road has been changed to a traffic circle, a slight deviation of the lane of the traffic circle from the formerly straight section of road can still be tolerated.

As a function of the ascertained departure from the travel route provided, a point-shaped geo-object is established from a predefined category of geo-objects, the established geo-object is predefined as a geo-object having a user-specific interest or having a user-specific relevance and, as a function of the predefined geo-object, the established travel route is changed to an alternative route to the destination with the predefined geo-object as an intermediate destination.

A geo-object is understood to be an actually existing object which can be clearly referenced by means of geodata. A geo-object can also be referred to as a so-called "point of interest" and can describe, by way of example, a filling station, a restaurant or a shop or a tourist attraction. The category of the geo-objects is, in connection with this, a thematic context of a service or a product which is provided at the geo-object, or a thematic context of information regarding an operator of the geo-object. By way of example, filling stations in the vicinity and/or all restaurants can therefore be established.

The disadvantages indicated above may be partially or completely eliminated. The intermediate destination is generated by the navigation apparatus and driven to, without losing sight of the actual destination. The driver of the motor vehicle or another occupant no longer has to actively adjust or predefine this during driving. This also results in increased driving safety because the driver is not at all put into a situation in which he has to awkwardly readjust the exemplary navigation device. The method according to the present aspect increases flexibility in the case of intermediate destinations which can be freely determined.

The deviation criterion may in some embodiments describe: a) an exceeding of a predefined threshold of a level of a deviation between the actual driving route and the travel route provided; and/or ascertaining a driving maneuver currently being performed by the motor vehicle, e.g., an unscheduled turning maneuver and/or a departure from a freeway and/or ascertaining that the motor vehicle is located on a road exit off the established travel route. The navigation apparatus can thus, by way of example, evaluate a position signal, by way of example a GPS signal, which can describe the current position of the motor vehicle and which can be compared with the coordinates of the established travel route. The navigation apparatus can perform a turning maneuver, by way of example, by evaluating a signal of a rotational angle sensor on the steering wheel of the motor vehicle. It is also conceivable that, by way of example, a distance of the current position of the motor vehicle from the travel route can be established. Such a deviation criterion makes it possible to perform the method according to the present aspect with the aid of, for example, sensor signals from sensors which are already present in the motor vehicle.

According to another exemplary embodiment, the predefining of the geo-object and/or a predefining of the category can be deliberately influenced in order to all the better react to the specific, current wishes of the driver. The geo-object can be predefined as a geo-object having user-specific interest as a function of: a location of the established geo-object within a predetermined radius around a current position of the motor vehicle, and/or an operating signal from an operating apparatus, wherein the operating signal describes a user-specific selection of the established geo-object, and/or a traffic sign detected by a sensor apparatus of the motor vehicle and/or by the navigation apparatus, and/or a user-specific preference recorded in a user profile.

The radius may be determined, by way of example, as a standard setting of the navigation apparatus. A device or a device component for receiving and detecting control actions is considered an operating apparatus, wherein the operating signal is provided as a function of the received and detected control action and can describe the control action and/or the function to be triggered by the control action. In the case of the example indicated above, the operating signal describes a user-specific selection of the established geo-object, by way of example if the navigation apparatus has established multiple geo-objects from the same category and/or different categories, it produces a corresponding output signal and transfers it, for example, to a screen so that, by way of example, a display field with a pictogram for a filling station and a display field with the pictogram for a restaurant are output by the exemplary screen, and the user touches the geo-object that he would like to drive to as an intermediate destination, by way of example, by touching that display field which displays said geo-object. The sensor apparatus, that is to say a device or a device component with a correspondingly configured sensor, can be used to detect traffic signs. The user-specific preferences recorded in the user profile can be, by way of example, preferred operators of the filling stations or, for example, information that those established geo-objects which offer groceries or meals may be of particular interest between 6.00 p.m. and 8.00 p.m.

Additionally or alternatively and in some embodiments, the category can be predefined as a function of: b) a value of an operating parameter of the motor vehicle system received from a motor vehicle system of the motor vehicle, e.g., as a function of a current tank filling level or a time signal received from a time measuring apparatus, wherein the time signal may, e.g., describe a point in time and/or a range of time, and wherein the time measuring apparatus is a device or a component part having, by way of example, a clock and/or a stop watch; and/or the traffic sign detected by the sensor apparatus of the motor vehicle; and/or the user-specific preference recorded in the user profile.

The traffic sign may, by way of example, be an indication of a tourist attraction and/or sanitary facilities and/or a filling station and/or a restaurant. A camera of the motor vehicle may, by way of example, detect the traffic sign, and image processing software, by way of example, can perform pattern recognition in order to identify the indication.

According to another embodiment, another geo-object from a different category than the predefined category of geo-objects can be established as a function of the ascertained departure from the travel route provided. This can be followed by a production, in each case, of an information output signal for each of the established geo-objects and/or for each of the categories, a transfer of the respective information output signal to an output apparatus of the motor vehicle in order to output the respective information output signal, and the receipt of a selection signal from the operating apparatus, wherein the selection signal can describe a user-specific selection of one of the established geo-objects and/or one of the categories. The geo-object can be predefined as a geo-object having user-specific interest as a function of the selection described by the selection signal. This embodiment has already been addressed above and illustrated on the basis of the exemplary two pictograms for a restaurant and for a filling station. It can be considered, by considering other categories and/or multiple established geo-objects, that the driver has perhaps left the exemplary freeway for another reason and not, for example, for reasons recorded in the user profile.

An output apparatus is understood to be a device or device component for outputting signals which, by way of example, may comprise a screen and/or loudspeakers. In this example, the signal to be output can be an image signal and/or video signal and/or audio signal.

The method according to the present aspect may furthermore be refined in some embodiments in that particular traffic situations with a geographical propagation of an adverse effect of a traffic flow on the route provided are also considered. According to another embodiment, the navigation apparatus can detect such a traffic situation as a function of the ascertained departure from the travel route provided. The established geo-object can be a merging of the travel route provided with a drivable infrastructure, by way of example a freeway entrance ramp, and the alternative route can lead via the drivable infrastructure at a point of the merging back to the travel route provided. It is thus possible, by way of example, to drive around a traffic jam. The merging can represent the geo-object. The travel route provided can be changed to the alternative route as a function of the ascertained geographical propagation. If the driver is located, by way of example, on a freeway and he realizes himself that he is heading towards a traffic jam and he therefore drives off the freeway, the navigation apparatus of the motor vehicle can guide the driver around this traffic situation and back to the freeway and therefore to the travel route originally provided.

According to another embodiment, the navigation apparatus may receive a selection signal from the operating apparatus, which can describe a sequence of multiple predefined geo-objects and/or a rejection of a predefined geo-object as a possible destination. The established travel route can then be changed to the alternative route as a function of the received selection signal. As a result, the user of the motor vehicle can influence the alternative route and implement his current wishes.

The object discussed in the preceding is likewise achieved by a navigation apparatus, which in one aspect, has a processor, wherein a device or a component part for electronic data processing is understood to be the processor. The processor is set up to running or executing program code stored in a storage medium and to perform a method according to any one of the method claims and/or the preceding description. This results in the advantages indicated above. The processor apparatus may have at least one microcontroller and/or at least one microprocessor in some embodiments.

The object set above is likewise achieved by the following devices, while achieving the advantages already indicated. This includes a storage medium according to a further aspect, having program code which is provided to being run by a processor of a motor vehicle and when executed, to perform one or more embodiments of the method discussed herein. The storage medium may be configured, by way of example, as a memory card or hard disk.

The motor vehicle according to a further aspect comprises a navigation apparatus according to the preceding discussion and/or a storage medium according to the preceding discussion.

Further exemplary embodiments of the invention are described below with reference to the drawings.

In the below exemplary embodiments, the described components of the embodiments each constitute individual features, which are to be considered independently of each other or in another combination than shown. Moreover, the described embodiments can also be supplemented by further features or aspects, which have been described in the preceding.

Elements having the same or similar functions are, in each case, provided with the same or similar reference numerals in the FIGS.

Figure 1:
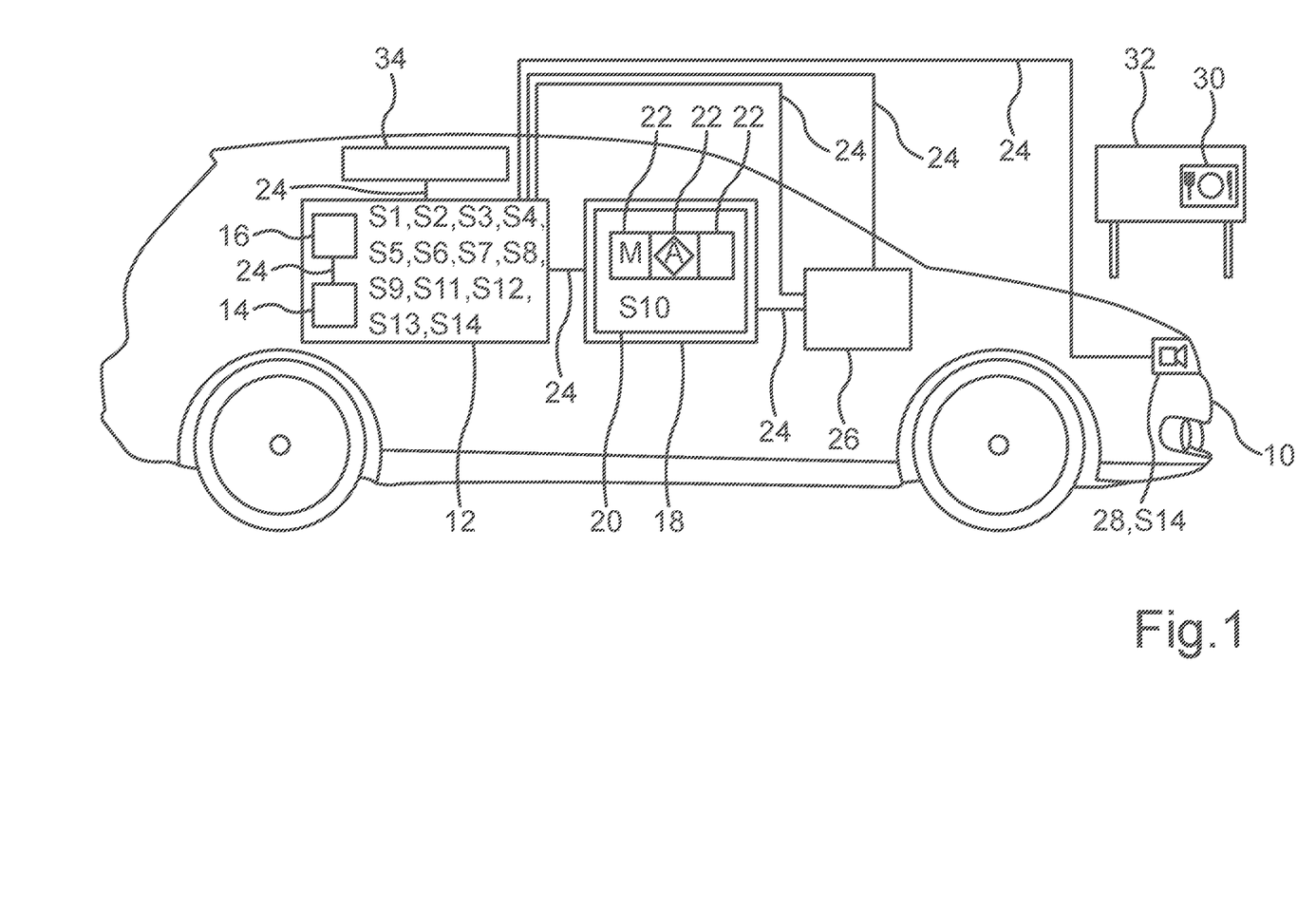
FIG. 1 shows a diagrammatic sketch of a first exemplary embodiment of the method according to the invention.

FIG. 1 illustrates the principle of a method according to an exemplary embodiment. To this end, FIG. 1 shows a motor vehicle 10 which can be configured, by way of example, as a passenger car.

The motor vehicle 10 has a navigation apparatus 12 which can be configured, by way of example, as a navigation system or navigation device. The navigation apparatus 12 can have a storage apparatus and/or a processor 16. The storage apparatus 14 can be configured as a data memory as known to the person skilled in the art, by way of example as a memory chip or as a memory card. The storage apparatus 14 can also be referred to as a storage medium. The processor can comprise at least one microcontroller and/or a microprocessor. The processor 16 can, by way of example, run a program code stored in the storage apparatus 14, in order to perform the method.

The motor vehicle 10 can optionally have an output apparatus 18 which can have a screen and/or a loudspeaker. In the example in FIG. 1, the output apparatus 18 comprises a screen, by way of example a touch-sensitive screen. In FIG. 1, a display area 20 is shown, on which, for example, three display fields 22 are displayed. The output apparatus 18 can be coupled to the navigation apparatus 12, by way of example via a data communication link 24 which can be a wired data communication link 24, by way of example a data bus of the motor vehicle 10, for example a CAN bus. As an alternative to the wired configuration, the data communication link can be a wireless data communication link 24, by way of example a Bluetooth or WLAN connection.

The output apparatus 18 on the display area 20 can, by way of example, also display a navigation map which can be provided, for example, by the navigation apparatus 12.

In the case of the configuration as a touch-sensitive screen, an operating apparatus 26 of the motor vehicle can be integrated into the output apparatus 18 and can have, by way of example, corresponding sensor technology for detecting touches of the exemplary screen. Additionally or alternatively, the operating apparatus 26 can have an operating element which can be configured, by way of example, as a keyboard or push and rotary switch.

FIG. 1 likewise shows an optional sensor apparatus 28 of the motor vehicle 10, which can have, by way of example, a camera mounted on a motor vehicle front or, by way of example, on a motor vehicle roof and a system for detecting and recognizing traffic signs, which is known to the person skilled in the art from the prior art, wherein the exemplary traffic sign 32 in FIG. 1 can represent, by way of example, a symbol 30 in the form of a pictogram of a restaurant or a service area.

The motor vehicle can optionally have a motor vehicle system 34, by way of example a tank device or an energy storage apparatus, wherein a device or a component for storing electrical energy may be an energy storage apparatus which can be configured, for example, as a traction battery, or the motor vehicle system 34 can, by way of example, have a time measuring apparatus, that is to say a device for measuring time and/or predefining a clock time.

The motor vehicle system 34 can have sensor technology, in order to detect an operating parameter of the motor vehicle system 34. This can be, by way of example, a sensor for detecting a current tank filling level, a measuring device for measuring the current time or a period of time or, by way of example, charge management for detecting a current charging state of the exemplary energy storage apparatus. A corresponding operating parameter signal produced by the motor vehicle system 34 can describe the indicated value of the operating parameter and can be provided by the motor vehicle system 34.

A vehicle operator of the motor vehicle 10 can, by way of example, be on the way from Ingolstadt to Munich. He uses the navigation apparatus 12 to navigate to his destination. The navigation apparatus 12 can provide a travel route from the starting point to the destination in accordance with a method known to the person skilled in the art from the prior art (method step S1).

A driver of the motor vehicle 10 can be guided by the navigation apparatus 12, by way of example, via a freeway. During the journey of the motor vehicle 10 the navigation apparatus 12 can ascertain the route actually being driven by the motor vehicle 10 (S2), by way of example in that a traveling motion of the motor vehicle can be detected. The traveling motion can be established, by way of example, on the basis of position signals which are received, for example, from a satellite, by way of example GPS signals which can respectively describe the geographical coordinates of a current position of the motor vehicle 10, and it is therefore possible to reconstruct the road which the motor vehicle 10 is actually driving along. The actual driving route can be deduced from this.

The navigation apparatus 12 compares the ascertained actual driving route with the travel route provided (S3), by way of example by comparing geographical coordinates of the travel route and the coordinates of the route actually being driven. For example, a deviation criterion can be saved in the storage apparatus 14 of the navigation apparatus 12, which deviation criterion can describe the conditions as of when a deviation between the actual driving route and the travel route provided leads to the conclusion that the motor vehicle has left the travel route provided. Such a deviation criterion can already be met in the example in FIG. 1, by way of example, in that the navigation apparatus 12 ascertains the unscheduled turning maneuver (S5) and/or that the motor vehicle 10 has already left the freeway.

Alternatively or additionally, it can be envisaged, for example, that the deviation criterion is met if the motor vehicle 10 is located, for example, at a road exit or at another location which is situated off the established travel route. To this end, a threshold of a distance between the travel route and the current location or the current position of the motor vehicle can be envisaged by way of example, and if this threshold is exceeded, this can be classified as an indication that the motor vehicle 10 has not, by way of example, only moved to an outer lane of the road of the established travel route or has only exited the freeway for a rest area, but has in fact left the travel route. The level of the deviation between the actual driving route and the travel route provided can, by way of example, depend on the distance, and an allocation of various distance values to corresponding gradual increments can be predefined, by way of example, in the navigation apparatus 12, or a numerical value as the level of the deviation can, by way of example, be predefined for an ascertained driving maneuver such as, by way of example, turning off from the travel route. Depending on whether the navigation apparatus 12 ascertains a turning off on a freeway off-ramp or an exiting to a rest area (S5), the corresponding numerical value of the level of the deviation can be read off.

In the example in FIG. 1, the deviation criterion can therefore be met by driving off the freeway, and therefore the navigation apparatus 12 can ascertain that the motor vehicle 10 has left the travel route provided (S4). By way of example, the driver can have recorded a standard setting in his navigation apparatus 12, the exemplary navigation system, that if, by way of example, the action of leaving the freeway at an exit ramp involving a deviation from the proposed travel route is ascertained, then he would like to drive to a branch of a predetermined restaurant chain with the aid of the navigation apparatus 12. He can record such a setting, by way of example, in a user profile of the navigation apparatus 12. In this example, a corresponding, predefined category of geo-objects can be, by way of example, "restaurants of operator M."

In method step S6, the corresponding restaurant or restaurants, by way of example, is/are established (S6), e.g., as a function of a radius around the current position of the motor vehicle 10, wherein the radius has been predefined, by way of example, in the user profile or, by way of example, prior to the journey. In the described example from FIG. 1, corresponding restaurants can be predefined as a geo-object having user-specific interest ("point of interest") (S7) in that the user adjusts this selection criterion, for example, before the journey or, for example, selects an established geo-object within a radius of, for example, ten kilometers by means of a control action.

If the navigation apparatus 12, the exemplary navigation system, finds a branch of the restaurant of operator M, by way of example, this can be driven to. To this end, the established travel route is initially changed to an alternative route (S8) as a function of the predefined geo-object, wherein the alternative route continues to have the same destination but takes the driver via the location of the restaurant as an intermediate destination of the new alternative route.

If, by way of example, the navigation apparatus 12 does not find an appropriate branch, it can optionally be envisaged that alternatives are proposed, by way of example a restaurant of operator B or a restaurant of operator K. If no alternatives can be found either, the user can be asked, by way of example by means of a corresponding display on the display area 20, whether the radius of the search should be extended and/or whether to return to the freeway. As a function of a corresponding user input by the driver, that is to say by way of example touching or tapping a corresponding display field or providing a voice input, the alternative restaurant can be considered in the alternative route or the motor vehicle 10 can be guided directly back to the freeway.

A radius of ten kilometers distance or a maximum of ten minutes additional driving time can, by way of example, be predefined as a radius. In the event that the navigation apparatus 12 does not, by way of example, find any corresponding geo-objects within the required radius, it can be envisaged, by way of example, that the user can be asked via the output apparatus 18 whether, by way of example, he would like to increase the radius of the search.

In the majority of cases, however, an off-ramp as described above, that is to say an exit ramp from the freeway, is taken because, by way of example, a truck stop having an associated restaurant has been announced, by way of example. The described approach provides a simplification to the effect that no annoying guidance back to the freeway is performed by the exemplary navigation system, therefore making the search for the truck stop more difficult, but the truck stop or respectively the restaurant branch can be automatically headed for as the new intermediate destination.

For example, a vehicle operator and/or a further vehicle occupant can optionally have respectively recorded a personal user profile for the navigation rules, for example, in the storage medium of the motor vehicle 10 or in a storage medium of a mobile terminal, by way of example a smartphone. The respective user profile can be assigned in the motor vehicle 10, for example, on the basis of camera-based person recognition and can be implemented fully automatically. To this end, the motor vehicle 10 can have, by way of example, a sensor apparatus with, for example, a camera and image analysis software. If the user profile is, for example, recorded on the mobile (personal) terminal, the user profile can be taken with the users in various motor vehicles 10 and can be considered fully automatically, for example during car sharing. By way of example, it can always be considered that it is necessary in the case of one person or that it is preferred by the person that toilets are driven to, for example at particular intervals. This profile can, for example, be saved on a server which is external to the motor vehicle independently of the motor vehicle 10 and/or independently of the mobile terminal and can be called up, for example, following recognition of a person and/or allocation to individuals.

According to another exemplary embodiment, a predefined association can be that if, for example, a freeway exit ramp is taken contrary to the driving route predefined by the exemplary navigation system and, by way of example, a tank level is on reserve or, by way of example, less than ¼ full, then a closest filling station is to be driven to. A corresponding threshold for a filling level can, by way of example, be predefined by the user of the motor vehicle 10, that is to say by way of example by the vehicle operator and, to this end, can be stored, by way of example, in the user profile. Alternatively or additionally, it can be predefined that during this action, for example, the closest filling station is always to be driven to irrespective of the tank filling level, that is to say for example each time the freeway is left. In the example, the navigation apparatus 12 can receive the operating signal, which can describe the exemplary tank filling level, from the motor vehicle system 34. This value can be compared with the optionally predefined threshold and if the value coincides with the threshold or describes the fact that the tank filling level is lower, by way of example, than the threshold, the "filling stations" category can be predefined as the category. Alternatively or additionally, the geo-object can be predefined, for example, as a function of this operating parameter (S7), wherein the geo-object thus predefined can be, by way of example, a filling station of a particular operator.

In order to specify filling stations of an operator A, by way of example, the procedure adopted for automatically generating intermediate destinations can also be, by way of example, that it can be predefined, by way of example, that only the filling stations of operator A are to be provided for refueling purposes, and the navigation apparatus 12 can look for or establish these on a driving route to the predefined journey destination, i.e., the destination location, for example in accordance with the tank filling level, with as little possible outlay in terms of time and/or kilometers and/or in accordance with the absolute level of the tank and/or the destination and/or a traffic situation, that is to say establish, that is to say generate, filling stations of operator A (S6) by way of example as an intermediate destination or intermediate destinations, losing as little time or kilometers as possible in the process. It can, for example, be made a requirement that the tank filling level is never to fall below a particular value, by way of example less than a ¼-full tank. A corresponding process can also be similarly provided, by way of example, for charging an energy storage apparatus of electric vehicles.

By way of example, the best filling opportunities or charging possibilities can be established in advance when starting off at the starting point and/or it can be established, at which intermediate stops, that is to say at which intermediate destinations, it can be useful to refuel or recharge the motor vehicle 10.

According to another exemplary embodiment, it can be considered that, when/if, for example, a selection is made contrary to the proposed travel route, a traffic situation can be detected (S9), by way of example there is a traffic jam and/or an announcement that there is a traffic jam or roadworks on the established travel route, by way of example for the next 50 kilometers, and this can be the reason for taking the exit ramp, although the fastest journey might possibly involve staying on the freeway, for example. A corresponding number of kilometers can optionally be indicated in advance by the vehicle operator, by way of example before the start of the journey or as a standard setting. If a corresponding message is provided and/or if, for example, a congestion sensor of the motor vehicle 10 detects a traffic jam, it can be shown that an optional, newly generated intermediate destination and/or the return to the freeway is/are possible, for example, a recalculation can be made with an alternative route which avoids the exemplary congestion, although the quickest route might be to continue on the freeway. A corresponding message can, for example, be received by the navigation apparatus 12 from a transmitter which is external to the vehicle, by way of example from a traffic service. On detecting the traffic situation (S9), a geographical propagation of the adverse effect of a traffic flow on the travel route provided may also detected. A merging of the travel route provided with a drivable infrastructure can be established as a geo-object (S6), that is to say by way of example a freeway entrance ramp lying ahead or, by way of example, an intersection of a country road, onto which the motor vehicle 10 has diverted, with a federal highway, along which the initially established travel route leads. The length of a traffic jam can, by way of example, be established on the basis of the traffic signal which can be provided by the traffic service. This information can be considered when changing to the alternative route (S8).

According to another exemplary embodiment and in the event that a departure from the route is ascertained, information of the environment of the motor vehicle 10, for example, can optionally be output by the output apparatus 18 which has not been pre-adjusted, that is to say entered, by way of example, by means of the operating apparatus 26 by the user of the motor vehicle 10 prior to the journey. For example, a suggestion for an intermediate stop, for example for eating, refueling or another category, can be made and a selection can be asked about by means of, by way of example, a dialog on the exemplary screen. A display field 22 with a pictogram for the eating category and another display field 22 with, for example, a pictogram for the refueling category can be output, by way of example, on the display area 20 (S10). The display fields 22 can, by way of example, stand for those geo-objects located within the radius of the motor vehicle 10, which have been established on leaving the travel route provided (S6). A respective category of geo-objects, that is to say an allocation of the geo-objects into categories can, by way of example, be digitally recorded in the navigation apparatus 12. The navigation apparatus 12 can then produce an information output signal for each of the established geo-objects and/or for each of the categories (S11), and this information output signal which can, by way of example, describe one of the pictograms, can then be transferred in method step S12 to the output apparatus 18 and can be output by the output apparatus 18.

By means of a control action, by way of example tapping the corresponding display field 22 or by means of a speech input, the user can select the desired geo-object and/or the desired category, and the operating apparatus 26 can, as a function of the control action received, produce an operating signal which can describe the control action and/or the selection, and can therefore also be referred to as a selection signal. In method step S13, the navigation apparatus 12 can receive the selection signal which can describe, by way of example, a selection of the "refueling" category. On the basis of this selection signal, the established filling station can then be predefined as an intermediate destination (S7).

According to another exemplary embodiment, in order to generate intermediate destinations to the journey destination, for example, from the starting point and/or from a current position of the motor vehicle 10, it can be predefined that, by way of example, only service areas or truck stops or off-ramps are to be provided, in which for example only a particular filling station chain and/or a particular restaurant can be provided. By way of example, a maximum radius can be defined, by way of example a radius of five kilometers and/or five minutes' driving time with intermediate destinations in which, by way of example, a combination of a filling station of operator A and a restaurant of operator M is to be available.

According to another exemplary embodiment, the intermediate destination generation can optionally be combined with traffic sign recognition. If, by way of example, immediately before an exit ramp, a restaurant or a tourist attraction for example is announced, for example by the traffic sign 32 and a symbol 30, this traffic sign 32 can be recognized by the method for traffic sign recognition known to the person skilled in the art from the prior art. To this end, the sensor apparatus 28 can, for example, detect the traffic sign 32 with the exemplary camera sensor (S14). Alternatively, corresponding information regarding traffic signs can be read out, by way of example, on the basis of map material stored in the navigation apparatus 12. The exemplary tourist attraction or the exemplary restaurant can then be driven to, for example when or if the user of the motor vehicle 10 has recorded this action in the exemplary navigation system as a default, namely selecting such an exit ramp contrary to the route specification.

Alternatively or additionally, the geo-object can also, for example, be a toilet and/or a filling station (for example a particular filling station chain) and/or any other restaurant chains and/or a tourist attraction and/or another point of interest. An association for automatically generating intermediate destinations can alternatively or additionally be brought about with these exemplary intermediate destinations.

The settings described above can optionally be recorded in a dedicated, personal profile for navigation system settings, which can be taken with the user as defaults for the navigation system from one motor vehicle 10 to the next motor vehicle. This profile can, for example, be recorded on a server which is independent of the motor vehicle 10 and can be called up if or when the person, for example, can be clearly recognized as the vehicle operator in the motor vehicle 10, and a profile can be allocated.

An individual user can, by way of example, prepare different dedicated profiles for different driving scenarios, which can be enabled before a journey. By way of example, special driving scenarios can already be proposed in the exemplary navigation system, which can be combined with dedicated profiles if necessary.

A possible profile can, by way of example, be "search for a toilet as quickly as possible," wherein, by way of example, in the case of exit ramps being taken contrary to the proposed route, for example, an intermediate destination which has the fastest possible access to a toilet can be indicated with high priority. During a journey having an indicated destination, toilets which are free to use and/or toilets charging a fee on the way there can, by way of example, be generated as intermediate destinations, between which a maximum driving time, which can optionally be predefined, is not to be exceeded from toilet to toilet.

Another exemplary profile can be a "journey with children," wherein, by way of example, in the case of exit ramps being taken contrary to the proposed route, restaurants which can be selected as hot favorites, for example branches of a fast food restaurant, can be provided among the intermediate destinations. During a journey having, for example, an indication of a destination it can be proposed, by way of example, at which branches an intermediate stop can be made, in order to also refuel at these intermediate destinations straight away, for example, at filling station chains which can be selected (by way of example of operator A). By way of example, windows of time or a window of time can be predefined, in which an intermediate stop at a branch is to take place. It can be considered that a predefined tank filling level and/or the status in the case of electric vehicles is not fallen below during the journey.

In another exemplary profile "leisure/informative drive with tourist attractions," for example after taking an exit ramp contrary to the proposed travel route of the navigation apparatus 12, tourist attractions can be proposed as an intermediate destination with a high priority. In the event that a travel destination is indicated, tourist attractions can be proposed as intermediate destinations for the travel route, which can be rejected if necessary (compare FIGS. 2A-2C). By way of example, the motor vehicle manufacturer can offer to provide audio texts and/or films for the tourist attractions. For example, a special sightseeing tour for children, with audio texts and/or films which are specially prepared for children, can be proposed.

Figure 2A:
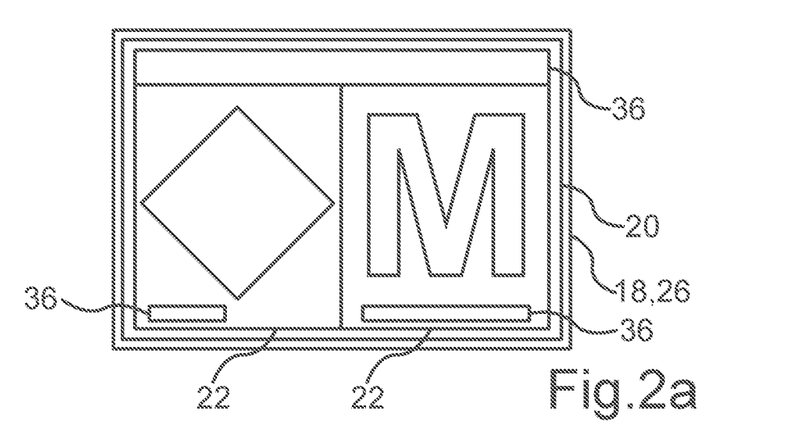
FIG. 2A, 2B, 2C each show a diagrammatic sketch of another exemplary embodiment of the method according to the invention.

If, according to another exemplary embodiment, by way of example, only one automatically generated intermediate destination, that is to say only one established geo-object, is present after an off-ramp, by way of example a restaurant, this can be driven to. If, by way of example, the current tank filling level is also below a predefined tank level at the same time, for example, a response may not be obvious, i.e., it may not be obvious which of the geo-objects is to be predefined. In this case, both intermediate destinations can, by way of example, be driven to, i.e., the alternative route can consider both geo-objects as intermediate destinations. FIG. 2A shows, by way of example, an output apparatus having the exemplary touch-sensitive screen. In the case indicated, a first display field 22 having an image of a logo of the filling station (the left display field 22 in FIG. 2A) can, by way of example, be displayed (S10), and a text field 36 can optionally, for example, be displayed (S10), in the example the text "in 2 km" can indicate that the exemplary filling station is still two kilometers away. The display field 22 represented, for example, on the right in FIG. 2A can, by way of example, display a logo of the restaurant or the restaurant chain, and an optional text field 36 having, for example, the indication that the restaurant will be reached "then in 800 m," that is to say a further text field 36 with an indication regarding a distance from the geo-object. The output apparatus 18 in FIG. 2A illustrates such a display to the effect that the filling station will be driven to first and then the restaurant. For orientation purposes, an additional optional text field 36 can be displayed, by way of example, via the two display fields 22 (S10) in which, for the orientation of the user, the text "next intermediate destinations" by way of example, can be displayed.

Figure 2B:
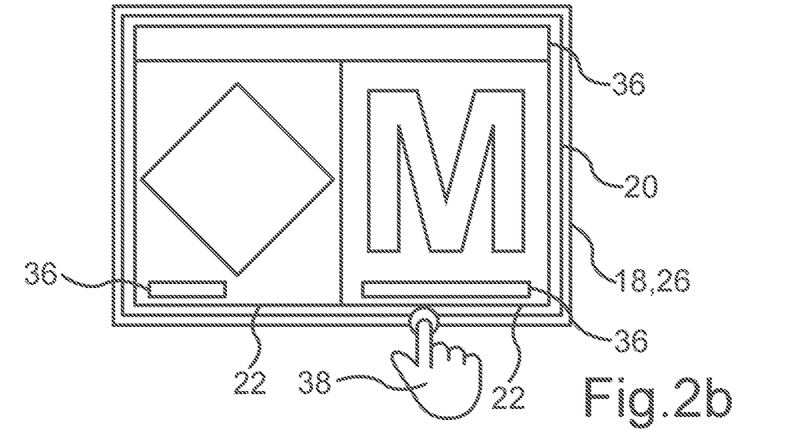

FIG. 2B shows the output apparatus 18 from FIG. 2A and, for example, a hand 38 of the user of the motor vehicle 10, wherein the user can touch the exemplary touch-sensitive screen on the right-hand display field 22 with his finger, for example. By quickly touching the display field 22 having the logo of the restaurant chain twice by way of example, the right-hand display field, that is to say the touched display field 22, can be highlighted in grey, by way of example, in order to display to the user that this intermediate destination is no longer being driven to. In other words, the user has rejected the intermediate destination of the restaurant chain in the example in FIG. 2B. The navigation apparatus 12 then no longer considers this rejected geo-object during the process of changing the travel route (S7).

Figure 2C:
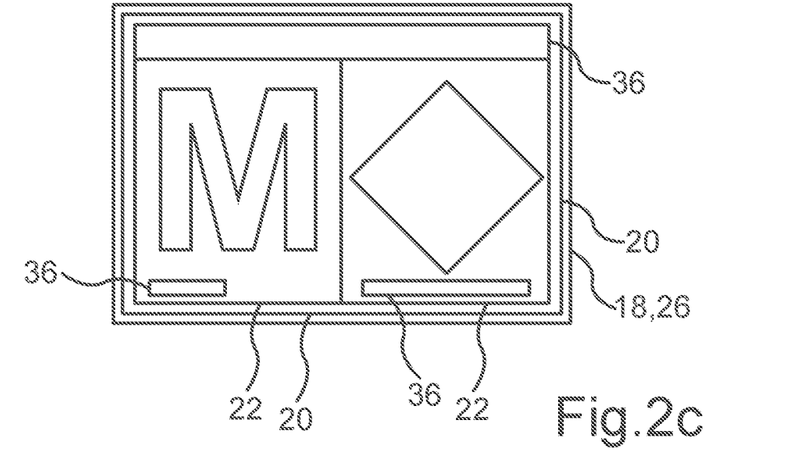

In the example in FIG. 2C, by touching and/or by displacing one of the two display fields 22 on the exemplary touch-sensitive screen ("touch display"), the symbol of the filling station can, by way of example, be displaced to the right and/or the symbol of the restaurant chain can be displaced to the left, in order to modify the sequence of the intermediate destinations to be driven to, that is to say in order to drive to the restaurant first, for example, and then the filling station. The operating apparatus 26 can produce a corresponding operating signal as a function of this control action and transfer this to the navigation apparatus 12. As a function of the operating signal which can also be referred to as a selection signal, the established travel route can then be changed to the alternative route (S7).

All in all, FIG. 2A, FIG. 2B and FIG. 2C each show a display of an exemplary vehicle display with two possible new intermediate destinations, by way of example a filling station of a predetermined operator and a restaurant of a predetermined operator. In other words, an intervention in the sequence of the intermediate destinations by the user of the motor vehicle 10, an exemplary vehicle operator, is illustrated.

Figure 3:
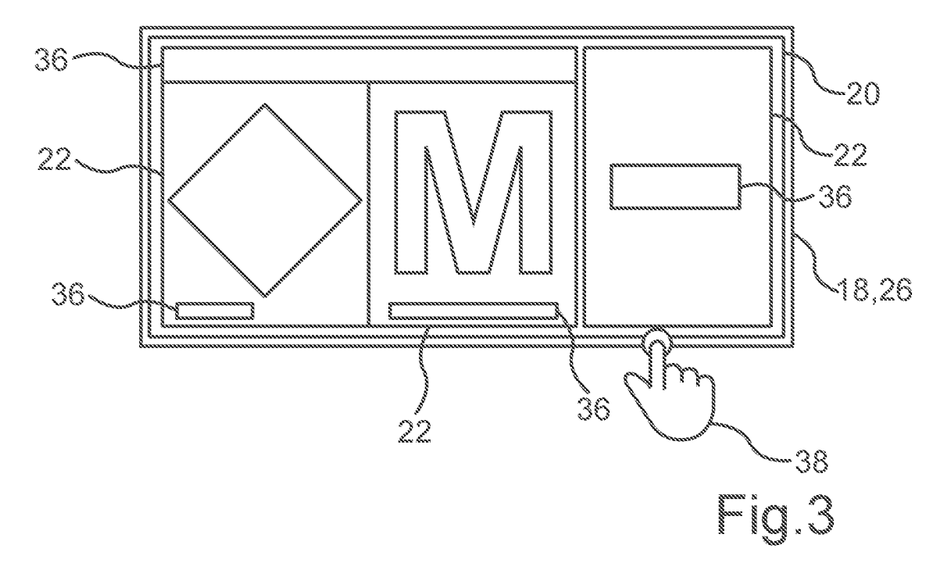
FIG. 3 shows a diagrammatic sketch of a first exemplary embodiment.

According to another exemplary embodiment, the user can reject an intermediate destination. Driving to the generated intermediate destinations, i.e., driving to the predefined geo-objects, can optionally be interrupted at any time, by way of example if or when a corresponding function for rejecting an intermediate destination is enabled, for example, by means of touching the exemplary display, for example a third display field 22 (FIG. 3). The text field 36 of the further display field 22, which is shown in FIG. 3 as an area which is highlighted in grey, can, by way of example, show the text "Back to the freeway/intended route after all." Additionally or alternatively, a priority can be predefined in advance, i.e., a sequence with which the intermediate destinations are to be driven to, if/when they are generated together.

FIG. 3 shows an exemplary display on the exemplary vehicle display, with two possible new intermediate destinations, by way of example a filling station and a restaurant in each case of a particular operator. Driving to the generated intermediate destinations can be interrupted, for example, at any time, if a corresponding function is enabled, for example, by touching the display field 22 with the exemplary text "Back to the freeway after all."

All in all, the exemplary embodiments show a method for assisting a user of a motor vehicle 10 when driving in the motor vehicle 10 and a navigation apparatus 12, by way of example a vehicle navigation system, with automatic generation of intermediate destinations. The exemplary navigation system can automatically produce a new intermediate destination, e.g., in the vicinity of the present vehicle position, by means of a practical action performed by the user of the motor vehicle 10, by way of example by the vehicle operator, during a change in the driving route with respect to the proposed driving route of the exemplary navigation system, with specific prerequisites, e.g., only on leaving a freeway.

Other variations to the disclosed embodiments can be understood and effected by those skilled in the art in practicing the claimed invention, from a study of the drawings, the disclosure, and the appended claims. In the claims, the word "comprising" does not exclude other elements or steps, and the indefinite article "a" or "an" does not exclude a plurality. A single processor, module or other unit or device may fulfil the functions of several items recited in the claims.

The mere fact that certain measures are recited in mutually different dependent claims or embodiments does not indicate that a combination of these measured cannot be used to advantage. A computer program (code) may be stored/distributed on a suitable medium, such as an optical storage medium or a solid-state medium supplied together with or as part of other hardware, but may also be distributed in other forms, such as via the Internet or other wired or wireless telecommunication systems. Any reference signs in the claims should not be construed as limiting the scope.

LIST OF REFERENCE NUMERALS

10 Motor vehicle
12 Navigation apparatus
14 Storage apparatus
16 Processor apparatus
18 Output apparatus
20 Display area
22 Display field
24 Data communication link
26 Operating apparatus
28 Sensor apparatus
30 Symbol
32 Traffic sign
34 Motor vehicle system
36 Text field
38 Hand
S1-S14 Method steps

What is claimed is:

1. A method for assisting a user of a motor vehicle when driving the motor vehicle, comprising the following steps performed by a navigation apparatus:

providing a travel route which describes a journey from a starting point to a destination;

evaluating a position signal, received from a GPS receiver, and determining the position of the motor vehicle from the position signal;

ascertaining a route actually being driven by the motor vehicle;

comparing the actual driving route ascertained with the travel route provided;

in response to the result of the comparison being that the actual driving route being driven by the motor vehicle meets a deviation criterion: ascertaining that the motor vehicle has departed the travel route provided;

defining a category of geo-objects as a function of at least one traffic sign detected by a sensor apparatus of the motor vehicle;

as a function of the ascertained departure from the travel route provided: determining at least one geo-object from the defined category of geo-objects; wherein the at least one geo-object is a geo-object having a user-specific interest; and as a function of the at least one geo-object: changing the established travel route to an alternative route to the destination with the at least one geo-object as an intermediate destination.

2. The method of claim 1, wherein the deviation criterion describes:

an exceeding of a predefined threshold of a level of a deviation between the actual driving route and the travel route provided; and/or ascertaining a driving maneuver currently being performed by the motor vehicle.

3. The method of claim 1, wherein the at least one geo-object is defined as the geo-object having the user-specific interest as a function of:

a location of the at least one geo-object within a predetermined radius around a current position of the motor vehicle; and/or an operating signal from an operating apparatus, wherein the operating signal describes a user-specific selection of the at least one geo-object; and/or a traffic sign detected by the sensor apparatus of the motor vehicle and/or by the navigation apparatus; and/or a user-specific preference recorded in a user profile.

4. The method according to claim 1, further comprising the following step, performed by the navigation apparatus:

defining the category additionally as a function of:

a value of an operating parameter of a motor vehicle system received from the motor vehicle system of the motor vehicle; and/or a user-specific preference recorded in a user profile.

5. The method of claim 1, further comprising the following steps, performed by the navigation apparatus:

as a function of the ascertained departure from the travel route provided: establishing another geo-object from a different category than the defined category of geo-objects;

producing an information output signal for each of the at least one geo-objects and/or for each of the categories;

transferring respective information output signal to an output apparatus of the motor vehicle in order to output the respective information output signal; and receiving a selection signal from the operating apparatus, wherein the selection signal describes a user-specific selection of one of the at least one geo-objects and/or one of the categories;

wherein the geo-objects are defined as geo-objects having user-specific interest as a function of the selection described by the selection signal.

6. The method of claim 1, further comprising the following step, performed by the navigation apparatus:

as a function of the ascertained departure from the travel route provided: detecting a traffic situation having a geographical propagation of an adverse effect of a traffic flow on the travel route provided;

wherein the at least one geo-object is a merging of the travel route provided with a drivable infrastructure, and wherein the alternative route leads via the drivable infrastructure and at a point of the merging of the travel route provided, and wherein the travel route provided is changed to the alternative route as a function of the geographical propagation.

7. The method of claim 1, further comprising the following step, performed by the navigation apparatus:

receiving a selection signal from an operating apparatus, wherein the selection signal describes a sequence of multiple geo-objects and/or a rejection of a geo-object as a possible destination;

wherein the established travel route is changed to the alternative route as a function of the received selection signal.

8. The method of claim 1, wherein the sensor apparatus comprises at least one camera.

9. A navigation apparatus having a processor and storage medium, wherein the processor is configured to perform the method according to claim 1 when executing program code stored on the storage medium.

10. The motor vehicle with the navigation apparatus according to claim 9.

11. The motor vehicle of claim 10, further comprising a GPS receiver to provide the position signal.

* * * * *